July 22, 1947.   W. V. HENRY   2,424,490
DEVICE FOR USE IN THE MANUFACTURE OF SYNTHETIC THREADS
Filed Nov. 23, 1945   7 Sheets-Sheet 1

INVENTOR
*William Vance Henry*
BY
*Albin F. Knight*
ATTORNEY

July 22, 1947.  W. V. HENRY  2,424,490
DEVICE FOR USE IN THE MANUFACTURE OF SYNTHETIC THREADS
Filed Nov. 23, 1945  7 Sheets-Sheet 3

INVENTOR.
*William Vance Henry*
BY
*Albin F. Knight*
ATTORNEY

July 22, 1947. W. V. HENRY 2,424,490
DEVICE FOR USE IN THE MANUFACTURE OF SYNTHETIC THREADS
Filed Nov. 23, 1945 7 Sheets-Sheet 4
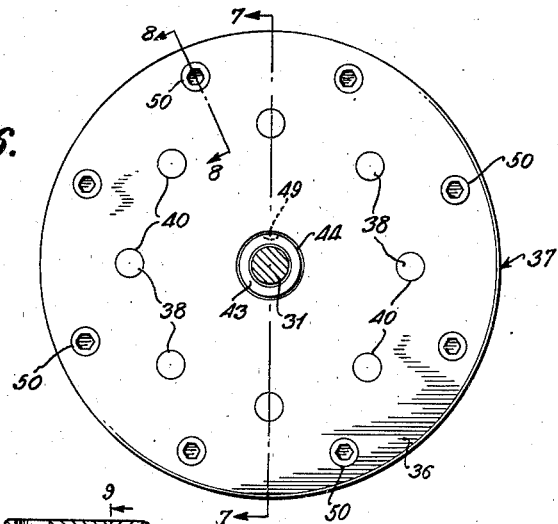
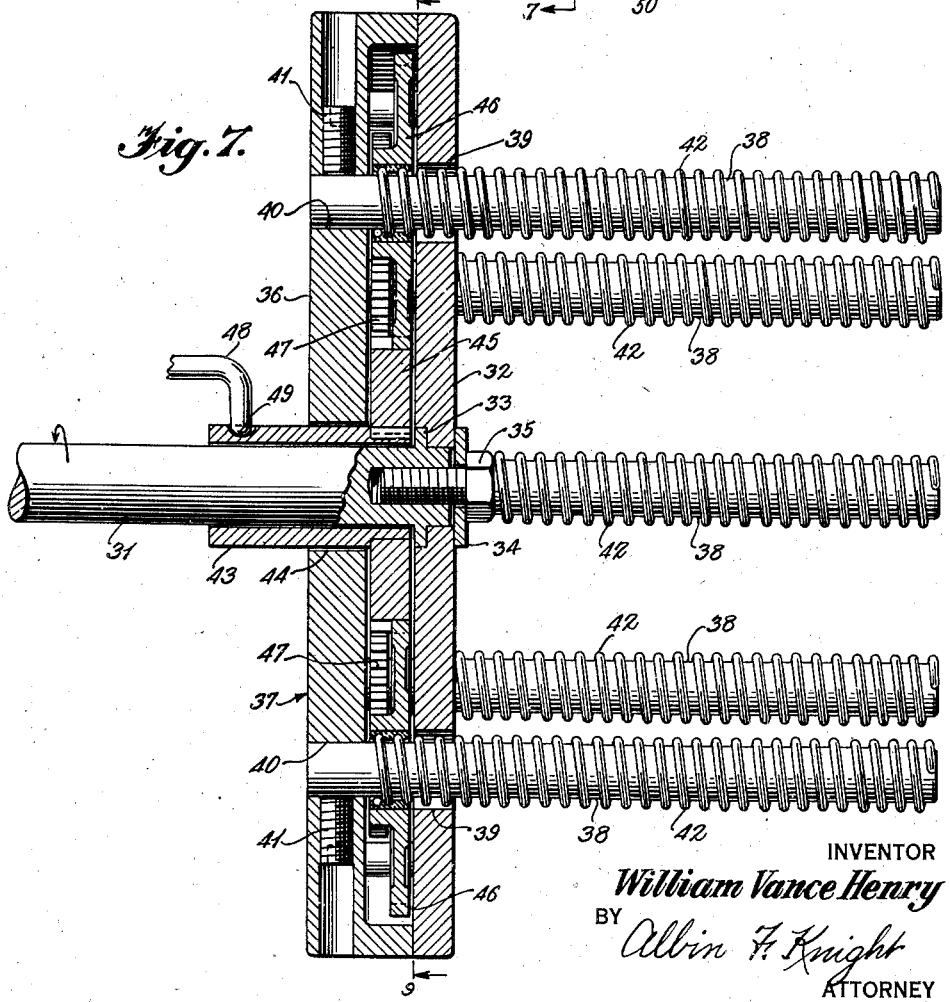
INVENTOR
William Vance Henry
BY
Albin F. Knight
ATTORNEY July 22, 1947.  W. V. HENRY  2,424,490
DEVICE FOR USE IN THE MANUFACTURE OF SYNTHETIC THREADS
Filed Nov. 23, 1945  7 Sheets-Sheet 5

INVENTOR
William Vance Henry
BY
Albin F. Knight
ATTORNEY

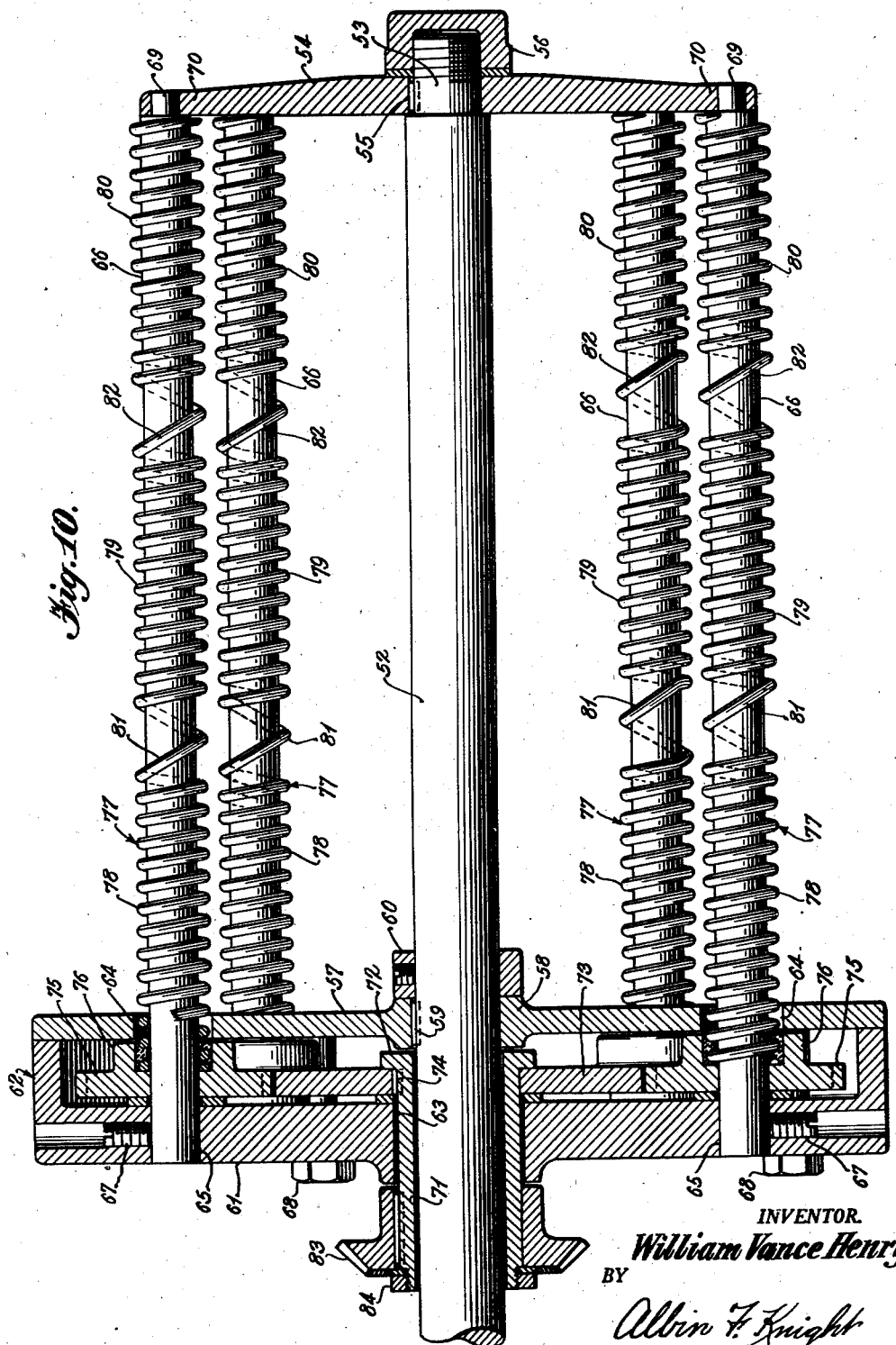

INVENTOR
William Vance Henry
BY
Albin F. Knight
ATTORNEY

Patented July 22, 1947

2,424,490

UNITED STATES PATENT OFFICE 2,424,490

DEVICE FOR USE IN THE MANUFACTURE OF SYNTHETIC THREADS

William V. Henry, Candler, N. C., assignor to American Enka Corporation, Enka, N. C., a corporation of Delaware Application November 23, 1945, Serial No. 630,466

15 Claims. (Cl. 28—71.7)

1

The present invention relates to thread handling devices and more particularly to improved thread-storage, thread-advancing devices to be used in the processing and aftertreatment of rayon yarn and the like.

In the production of rayon yarn such as that manufactured according to the viscose process, several types of thread-storage, thread-advancing devices are now being employed commercially. These devices are particularly useful in the continuous spinning process wherein the thread is caused to move longitudinally of each of the devices in the form of a multiplicity of helices and during its movement is given different treatments thereon. Whereas the prior devices are efficient, they are mechanically complicated and expensive to manufacture, install and maintain.

It is therefore an object of the present invention to provide a thread-storage, thread-advancing device that is charaterized by its simplicity of construction and its adaptability to the use of commonplace materials such as glass, Lucite, etc., all of which reduce its cost of manufacture and replacement to a minimum.

A further object of this invention is the provision of a thread-storage, thread-advancing device that is self-threading and self-cleaning so that it is particularly suitable for use in all types of rayon spinning systems.

Another object of the invention is to provide a rotatable cage-like member having an annular series of bars or rods for supporting a multiplicity of helices of thread and cam means mounted on the bars or rods for applying a displacing action to move the helices longitudinally of the bars or rods during rotation of the cage-like member.

Other objects and advantages of the invention will become apparent from the following detailed description when considered in connection with the accompanying drawings wherein:

Figure 6 is a rear elevational view of a modified form of cage member;

Figure 7 is a longitudinal sectional view taken on line 7—7 of Figure 6 showing the disc rotated and the sun gear maintained stationary;

2

Figure 1:
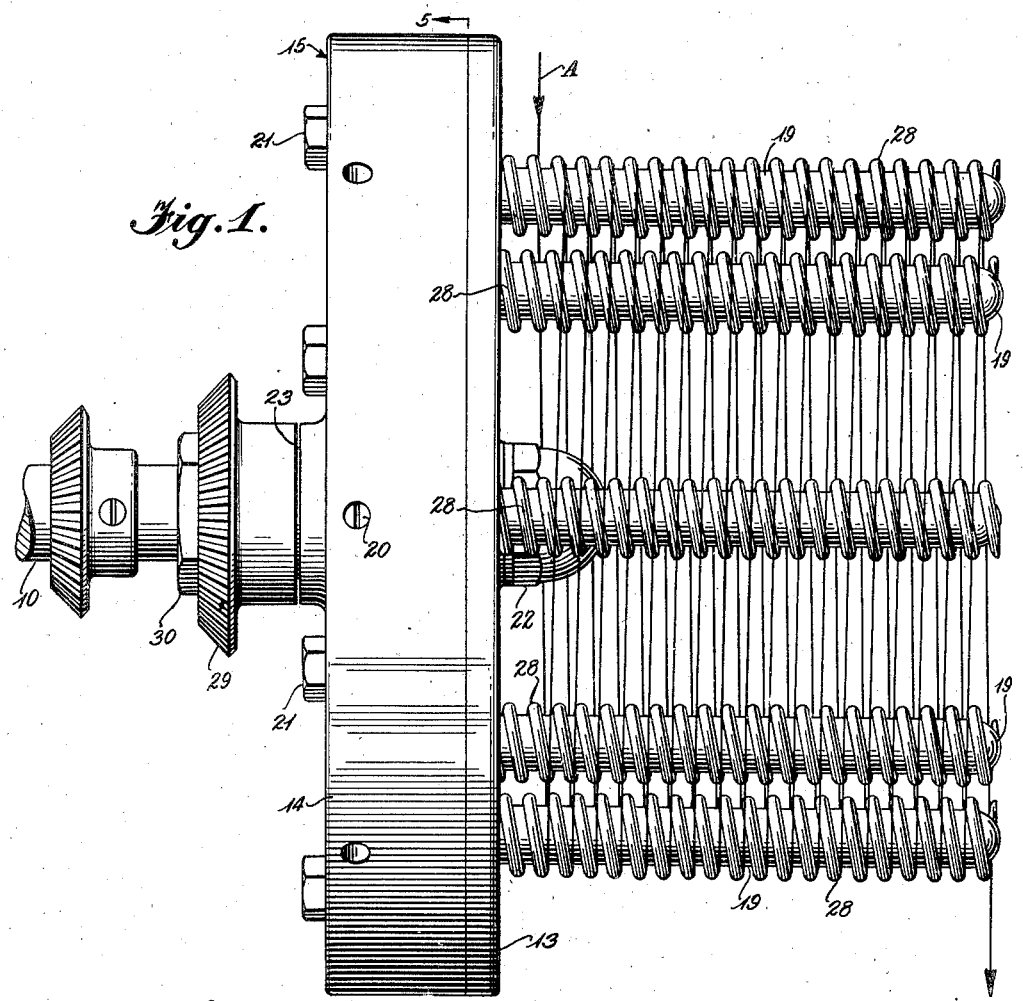
Figure 1 is a side elevational view of a device constructed in accordance with this invention.
Figure 2:
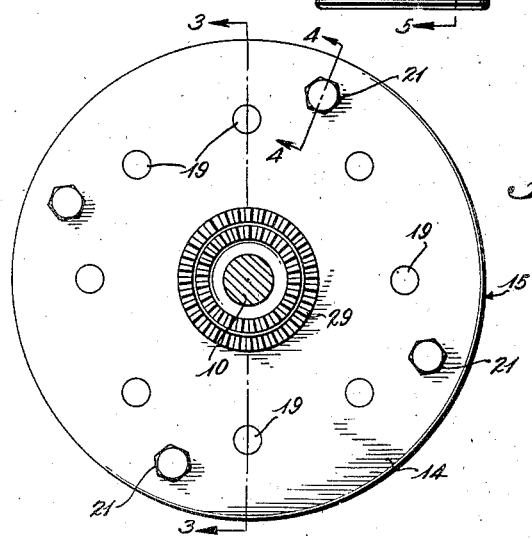
Figure 2 is a rear view of the device shown in Figure 1.
Figure 3:
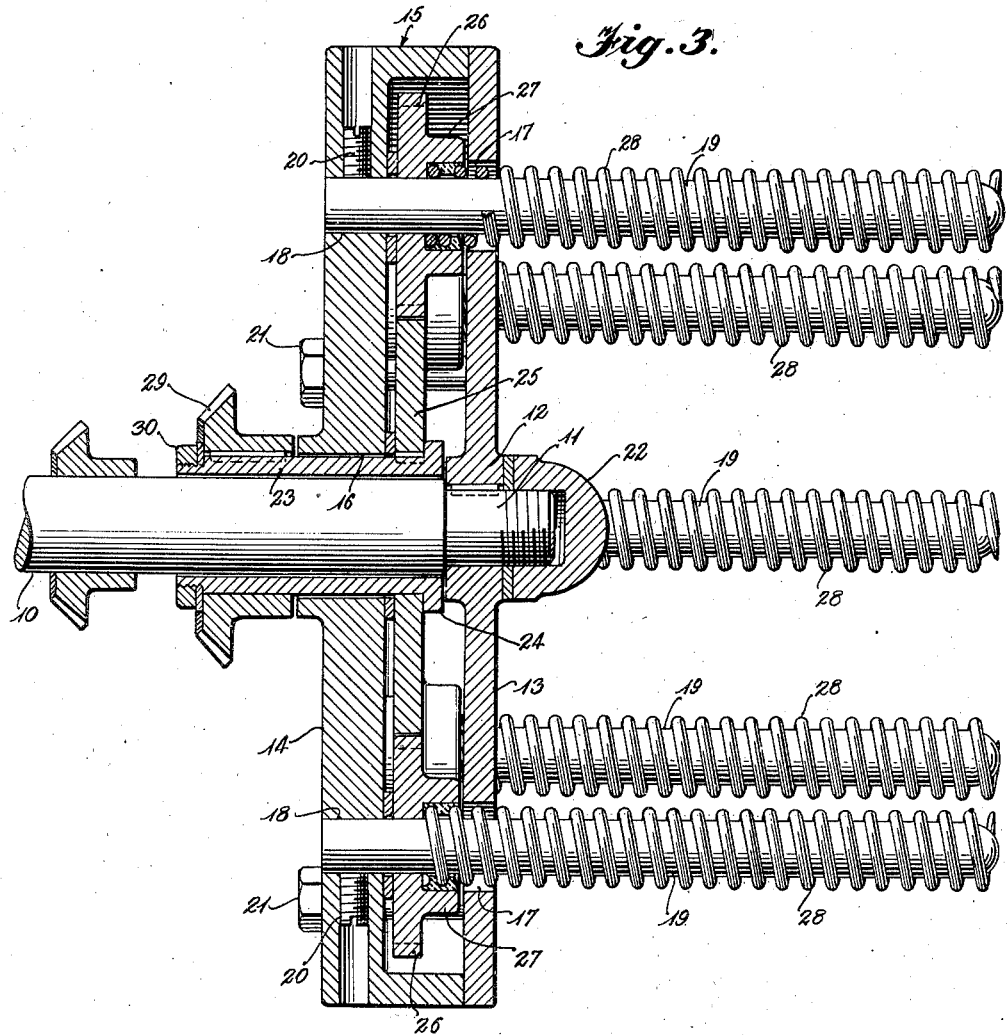
Figure 3 is a longitudinal sectional view taken on line 3—3 of Figure 2.
Figure 4:
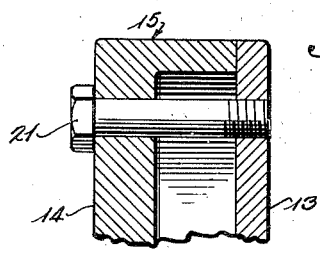
Figure 4 is a fragmentary sectional view taken on line 4—4 of Figure 2.
Figure 5:
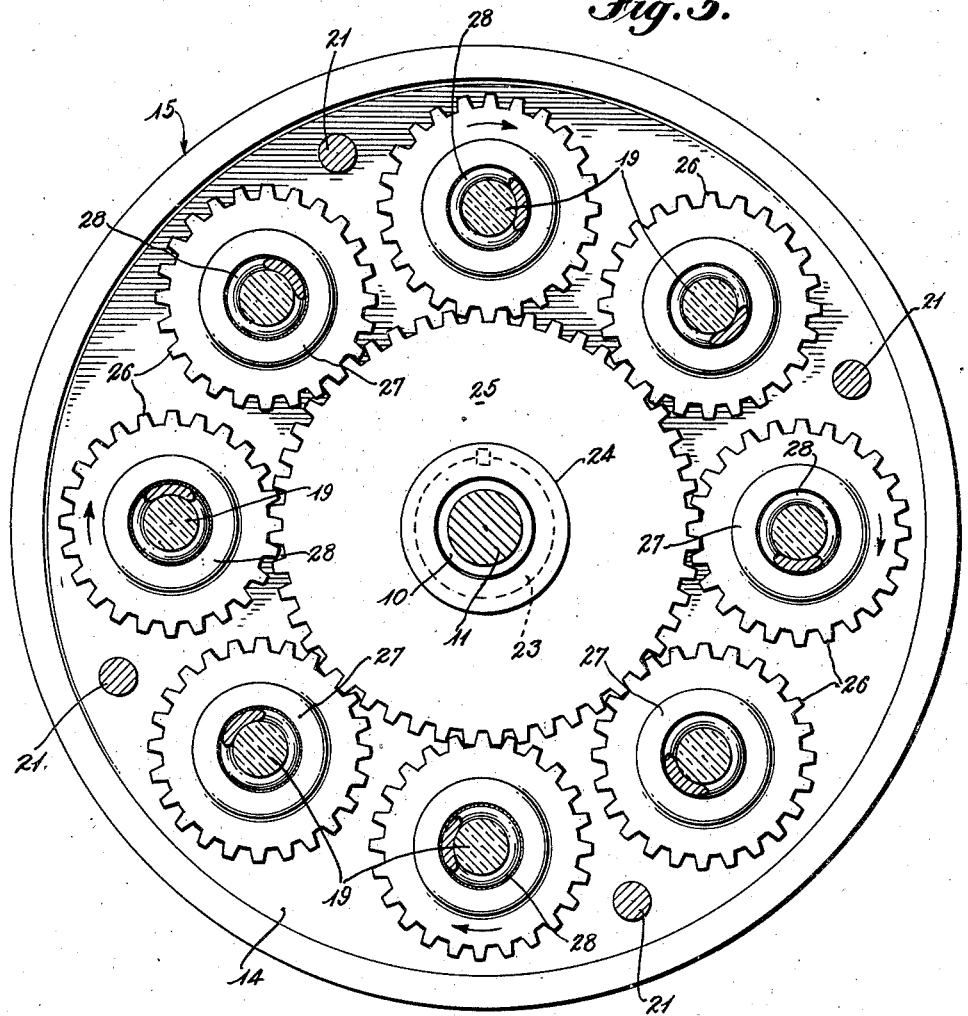
Figure 5 is a transverse sectional view taken on line 5—5 of Figure 1.
Figure 11:
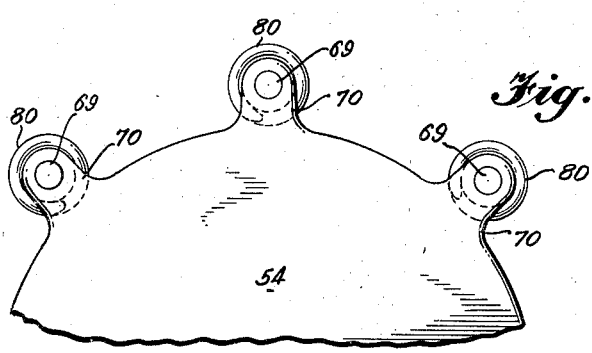
Figure 9:
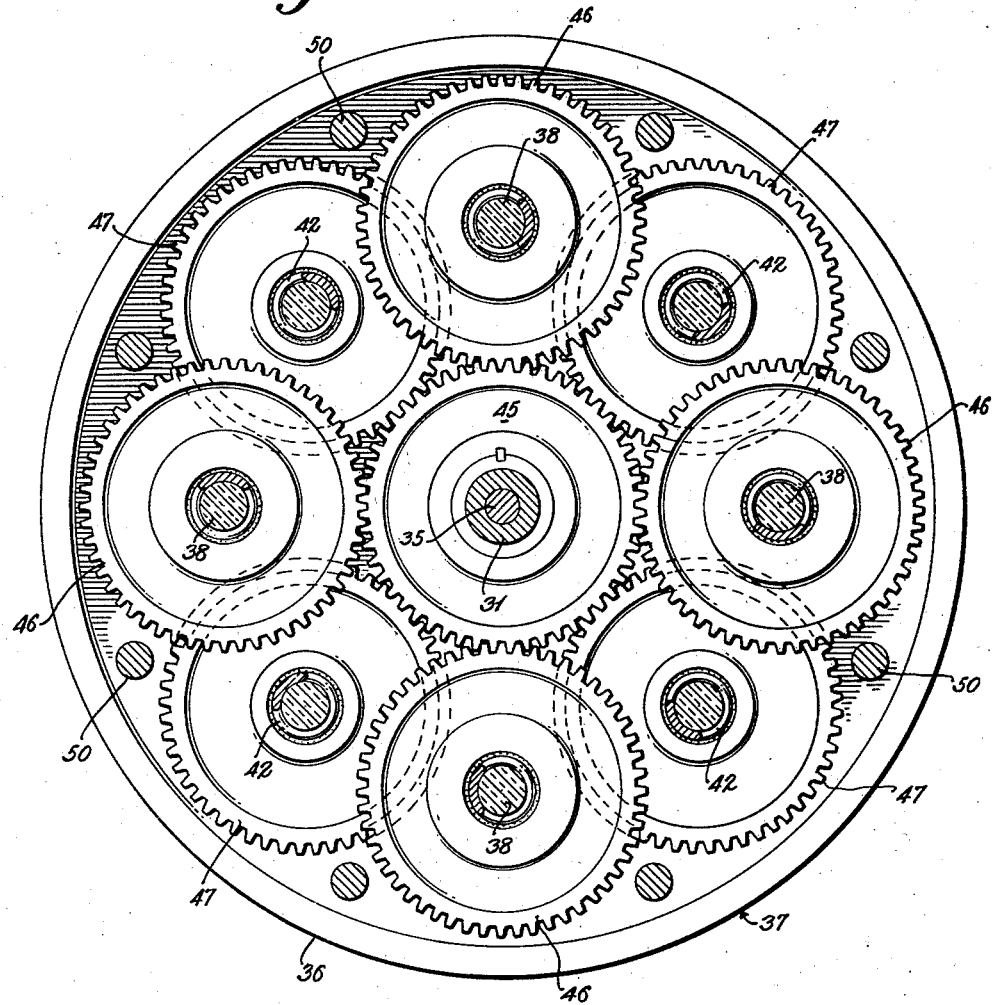
Figure 8:
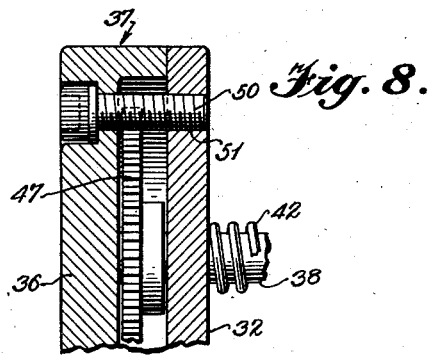
Figure 12:
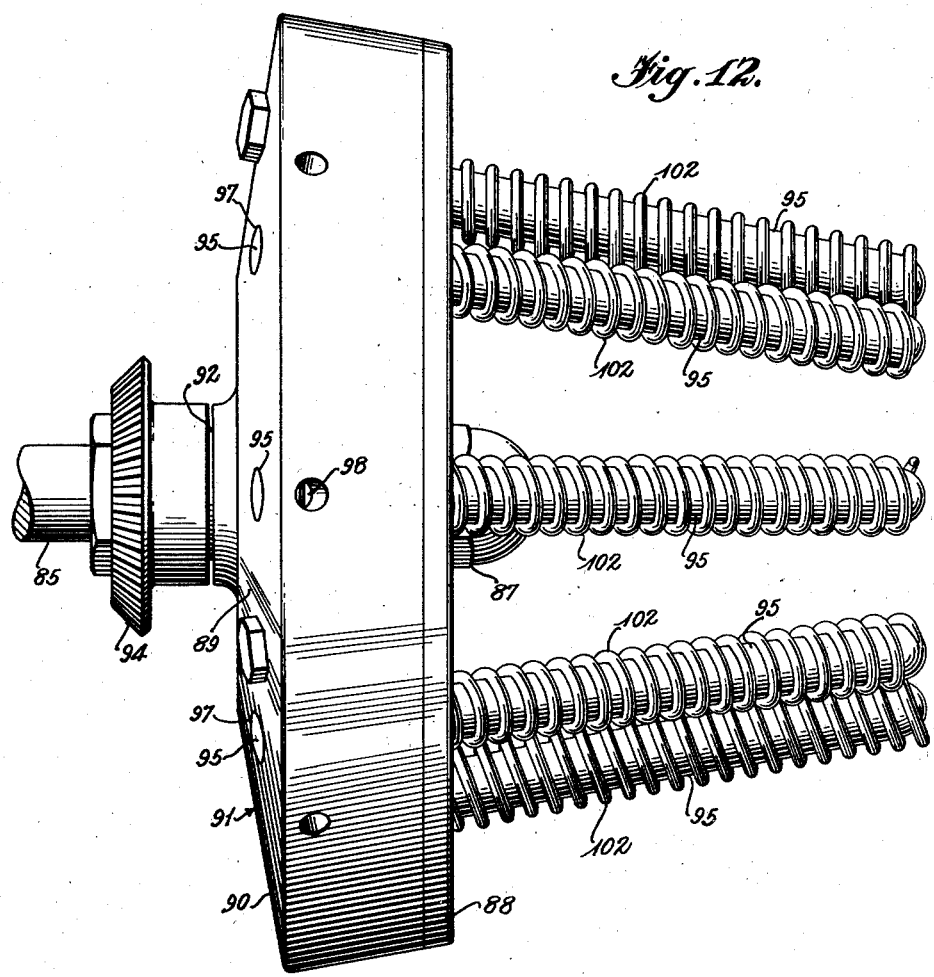
Figure 13:
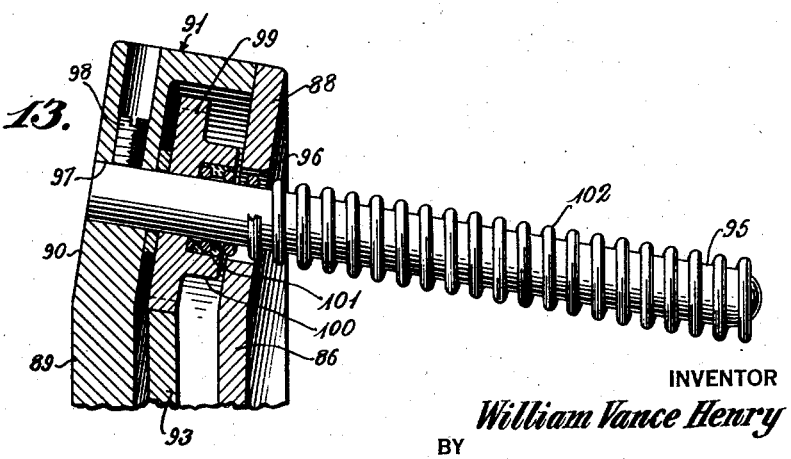

Figure 8 is a fragmentary sectional view taken on line 8—8 of Figure 6;

Figure 9 is a detailed sectional view taken on line 9—9 of Figure 7;

Figure 10 is a further modified form constructed in accordance with the present invention showing a longitudinal sectional view of a cage member having multiple treating sections;

Figure 11 is a fragmentary elevational view of the front end plate of the form shown in Figure 10;

Figure 12 is a side elevational view of a modified form of cage member that operates similar to Figures 1 and 7, except that shrinkage is effected thereon by inclining the rods so that they converge from the rear to the front of the member; and Figure 13 is a fragmentary longitudinal sectional view of the form shown in Figure 12.

In the drawings and more particularly in Figures 1-5, inclusive, the numeral 10 indicates a drive shaft which is mounted in bearings, not shown. Drive shaft 10 is reduced at 11 to receive hub 12 of circular plate 13. Hub 12 is keyed to reduced shaft portion 11 and the plate therefore rotates with the shaft. Plate 13 forms a cover for a cup member 14 and with the cup member constitutes a housing generally indicated at 15. Cup member 14 is provided at its center with an opening 16 through which shaft 10 extends. Series of annularly arranged openings 17 and 18 are formed in plate 13 and cup member 14, respectively. Parallel bars 19 are arranged in annular formation and each bar extends through one of the openings 17 in the plate and into the corresponding opening 18 in the cup. The bars are anchored within the openings 18 in the cup member by means of lock screws 20. Plate 13 and cup member 14 are secured together by means of bolts 21. Housing 15 is secured in fixed position for rotation with shaft 10 by means of a cap nut 22. It will be seen that rotation of shaft 10 will result in rotation of housing 15 and the bodily rotation of bars 19 and that the housing and bars form a rotating cage-like structure.

A tubular shaft 23 is mounted for rotation upon shaft 10. Opening 16 in cup member 14 is sufficiently large to permit tubular shaft 23 to extend within housing 15 although the walls of the opening closely encircle the shaft. Shaft 23 is provided with an annular flange 24 at its inner end and a sun gear 25 keyed to tubular shaft 23 abuts against the flange. Planet gears 26 are positioned within housing 15, each of the planet gears being rotatably mounted upon one of the bars 19. The planet gears 26 are each formed with an annular flange 27 extending in the direction of plate 13, the flanges being spaced from the bars 19 sufficiently to provide a recess for the reception of the inner ends of coil cam members 28. Each bar 19 has one of the coil cam members 28 rotatably mounted thereon and each coil cam member is secured within the recess of its respective planet gear for the purpose of causing the independent rotation of the coil cam member about its supporting bar. The outer ends of the coil cam members terminate in a plane with the ends of the annularly arranged bars 19.

A bevel gear 29 is keyed to tubular shaft 23 at the end remote from flange 24. Gear 29 is maintained in position upon the shaft by means of a nut 30. Suitable means, not shown, are utilized for driving shaft 23 and sun gear 25 through the medium of gear 29 and suitable means, similarly not shown, are provided for driving shaft 10.

In the manufacture of viscose rayon the spinning solution is extruded through spinnerettes into an acid treating bath whereupon the resultant yarn is subjected to various treatments, depending upon the particular type of yarn being produced. It is customary to stretch the yarn as it is drawn from the acid bath and to subject it to a series of treatments, that is, washing, desulphurizing, further washing, bleaching, still further washing and drying. A series of devices of the form illustrated in Figures 1-5, inclusive, are admirably suited for handling yarn during the continuous production of rayon wherein the yarn is subjected to several treatments prior to collection, as it is advanced linearly in helical form. In utilizing the device as thus described in the manufacture of rayon, a spinning solution is extruded into an acid bath. Shafts 10 and 23, having been set in motion with resultant rotation of the cage-like structure formed of the housing 15, the extending bars 19 and coil cam members 28, the leading end of the thus formed yarn A is placed upon the bars, 19 adjacent plate 13. Convolutions of the yarn A will then form upon the bars and the continuance of the operation will result in the automatic threading of the yarn until a helix is formed extending throughout the length of the bars. The leading end of the yarn will then pass from the cage-like structure and move downwardly where it may be threaded in the manner described upon a similar device. This procedure may be continued in the threading of several thread-storage, thread-advancing devices until the yarn reaches the point of collection.

In the form of device illustrated in Figures 1-5, inclusive, there is a 1:2 ratio between the planet gears 26 and the sun gear 25. Since the yarn is delivered to the cage-like structure at a linear speed equivalent to the speed of bodily rotation of the outer surfaces of bars 19, it is necessary that the speed of rotation of shaft 23 be one-half that of shaft 10 when it is desired that consecutive convolutions of yarn be spaced one cam apart within the coils of the cam member 28. However, the convolutions of the yarn may be spaced more than the distance between the coils of members 28 by varying the relative speeds of shaft 10 and shaft 23. Wider spacing of the convolutions may be obtained by driving shaft 23 in a counter direction to that of shaft 10.

In referring specifically to the operation of the relative parts of the device it will be seen that the driving of shaft 10 causes bodily rotation of bars 19 and the coil cam members 28 thereon. Since the driving of shaft 23 at one-half the speed of shaft 10 effects relative rotation between sun gear 25 and planet gears 26, corresponding relative rotation will be had between coil cam members 28 and the respective bars 19. Therefore as the yarn is wrapped about the outer surfaces of the bars 19 and the cam members are rotated with respect to the bars, the thread lying between the cam surfaces will be gently displaced toward the outer ends of the bars; in order to facilitate the displacement, the yarn contacting surface portions of the bars may be provided with one or more longitudinal corrugations. Continued rotation of the cage-like structure will form a helix of the yarn. As yarn is continued to be delivered to the device the leading end of yarn will be discharged therefrom and succeeding portions of yarn will form a rotating helix which is constantly moving in an axial direction toward the point of discharge.

The yarn while moving upon the device may be treated with liquids either by spraying of the same upon the yarn or by immersion of the device with the yarn thereon within a liquid bath.

In a modified form of the invention illustrated in Figures 6-9, inclusive, shaft 31 is mounted in bearings, not shown, for supporting the device. Plate 32 is secured to the free end of shaft 31 between a flange 33 on shaft 31 and a washer 34 held in position by a bolt 35 threaded into the end of the shaft. Plate 32 constitutes a cover for cup member 36 and together they constitute a housing generally indicated at 37. A series of annularly arranged bars 38 extend through openings 39 arranged adjacent the periphery of plate 32 and the inner ends of the bars are anchored in corresponding openings 40 in cup member 36 by means of lock screws 41. Since the plate adjacent the central opening thereof is clamped between flange 33 and washer 34 the rotation of shaft 31 will result in the rotation of housing 37, together with the bodily rotation of bars 38. A coil cam member 42 is mounted for rotation upon each of the bars 38, the ends of the coil cam members extending through openings 39 in plate 32 and terminating adjacent the inner wall of cup member 36. A tubular shaft 43 is mounted for rotation relative to shaft 31 and the inner end of the tubular shaft extends through the closely fitting opening 44 at the center of cup member 36. A sun gear 45 is keyed to the inner end of shaft 43, the sun gear 45 being in mesh with two series of planet gears 46 and 47, respectively. Each planet gear of the respective sets is mounted upon and fixed to the inner ends of one of the coil cam members. The planet gears of the set adjacent plate 32 have hubs extending in the direction of the inner wall of cup member 36 whereas the other set of planet gears have their hubs extending in the direction of plate 32.

The planet gears of the respective sets are alternated upon the bars 38. The planet gears are approximately one-half the width of the sun gear. Since the gears are preferably of such size that there is a 1:1 ratio between the planet gears and the sun gear, the planet gears of the respective sets will overlap in the manner illustrated in Figure 9. By providing two sets of planet gears it is possible to construct a very simple and efficient device in which the sun gear is held stationary and the ratio of the planet gears to the sun gear is 1:1 and in which eight annularly arranged bars 38 with their respective coil cam members may be utilized.

In the modified form of device illustrated in Figures 6-9, inclusive, a latch member 48, secured to a fixed part of the mechanism in a manner not shown, has its end inserted in depression 49 of shaft 43. Plate 32 and cup member 36 are secured together in operative position by means of countersunk screws 50 threaded into openings 51 in plate 32.

Operation of the device illustrated in Figures 6-9, inclusive, is similar to the operation of the form heretofore discussed. In operating this form of the present invention, rayon yarn is drawn from the coagulating bath and the leading end thereof placed upon bars 38 adjacent plate 32. The cage-like member formed of the bars, the housing and the coil cam members, having previously been set in motion by the rotation of shaft 31, the yarn begins to wrap about the cage. During the entire operation sun gear 45 is maintained stationary with its tubular shaft 43 by means of latch member 48. As the ratio of each of the planet gears to the sun gear is 1:1 and as the yarn is taken up by the cage-like member at a speed equivalent to the movement of the outer surfaces of bars 38, the relatively moving coil cam members will cause the turns of yarn to be spaced along the bars with the yarn of the turns lying between adjacent cam surfaces in the respective coil cam members. The continued operation of the device will cause the yarn to travel in a helical path with the production of a yarn helix extending throughout the length of the bars 38. As stated, the turns of yarn will be spaced one coil apart in each of the coil cam members. Further operation of the device will, with continued delivery of yarn to the surfaces of the bars adjacent plate 32, result in the maintenance of the referred to helix with the continued discharge of yarn from the ends of the bars. The yarn in the helix is therefore progressively moved in an axial direction toward the point of discharge. The device illustrated in Figures 6-9, inclusive, like the device illustrated in Figures 1-5, inclusive, may be utilized in series with similar devices and the yarn may be subjected to various treatments on each of the devices in its passage to a point of collection.

In the continuous manufacture of viscose rayon as well as in the treatment of other thread, the process involves a plurality of liquid treatments of the yarn or thread as it is conducted linearly. In Figures 10 and 11 of the drawings a modified form of the device constructed in accordance with this invention is illustrated, the device being primarily intended for the passage of yarn helically while it is subjected to several liquid treatments on the same device. Since it is necessary to separately recover and recirculate at least some of the treating liquids after reconditioning of the same in order for the viscose rayon process to be commercially feasible this form of device is constructed in a manner to cause the yarn to assume a plurality of separate and substantially independent helices in its passage to the point of collection. This result may be accomplished by the use of the modified form of device shown in Figures 10 and 11 of the drawings, which construction is quite similar to that of the device illustrated in Figures 1-5, inclusive, except for the elongation thereof to provide for the formation of three helices of yarn on the same device.

In the modification shown in Figure 10 numeral 52 designates the drive shaft for cantilever support of the device. The drive shaft is secured in bearings, not shown. Shaft 52 is reduced at 53 to receive thereover a plate 54 which is keyed to the shaft as at 55. A cap nut 56 is provided for securing the plate in position upon the shaft. Another plate 57 provided with a hub 58 is mounted upon and keyed to the shaft 52 as indicated at 59 and a lock ring 60 engages plate 57 for securing it in position. Plate 57 forms a cover for a cup member 61, plate 57 and cup member 61 forming a housing designated generally at 62. Cup member 61 is provided at its center with an opening 63 through which shaft 52 extends. A series of annularly arranged openings 64 and 65 are formed in plate 57 and cup member 61, respectively. Parallel bars 66 are arranged in annular formation and each bar extends through one of the openings 64 in the plate and into the corresponding opening 65 in the cup. The bars are anchored within the openings 65 in the cup member by means of lock screws 67. Plate 57 and cup member 61 are secured together by means of bolts 68.

It will be seen that housing 62 is fixed for rotation with shaft 52 by the key 59. The ends of bars 66 are reduced at 69 and plate 54 is provided with a number of openings corresponding to the number of bars 66. Reduced portions 69 of the bars are received in said openings. As shown in Figure 11 the openings in plate 54 are each formed in an ear 70, a series of which ears corresponding to the number of bars 66 extend around the periphery of plate 54. Tubular shaft 71 is mounted for rotation upon shaft 52. Opening 63 in cup member 61 is sufficiently large to permit tubular shaft 71 to extend therethrough and into housing 62. The walls of opening 63 closely encircle shaft 71.

Shaft 71 is provided at its inner end with an annular flange 72 and a sun gear 73 is keyed to shaft 71 as at 74. Sun gear 73 abuts against flange 72 of the shaft. Planet gears 75 are positioned within the housing 62 and each of the planet gears is rotably mounted upon one of the bars 66. Planet gears 75 are each formed with an annular flange 76 extending in the direction of plate 57. Flanges 76 are spaced sufficiently from bars 66 so that recesses are provided adjacent the bars for the reception of the inner ends of coil cam members indicated generally at 77. The coil cam members are provided with a plurality of series of closely spaced convolutions the series being designated as 78, 79, and 80, respectively. For the purpose of transmitting a rotary motion to the separate series of convolutions in each coil cam member 77, wide angled convolutions 81 and 82, respectively, are utilized to connect the adjacent series.

A bevel gear 83 is keyed to tubular shaft 71 at the end remote from flange 72. Gear 83 is maintained in position upon the shaft by means of a nut 84. Means, not shown, are utilized for driving shaft 71 and shaft 52 to effect rotation of housing 62 with shaft 52 and rotation of sun gear 73 with shaft 71. The shafts are driven at different speeds to effect relative motion between the sun gear and planet gears with corresponding rotary motion between coil cam members 77 and the bars 66 upon which they are respectively mounted.

In the manufacture of viscose rayon involving the use of the modified form of device shown in Figures 10 and 11 the yarn is drawn from the spin bath in the same manner described in connection with the operation of the device of Figures 1-5, inclusive. Upon rotation of shaft 52 and the rotation of shaft 71 at a rotary speed one-half that of shaft 52 a helix of yarn will form on bars 66 with the turns thereof lying between adjacent convolutions of the closely spaced coils in series 78. Upon continued operation the yarn will be caused to progress along the bars in helical form until it reaches plate 54. Due to the formation of the wide angles in the convolutions of the coil cam members at 81 and 82, widely spaced turns will occur in the yarn helix at these points. The widely spaced turns will constitute a separation zone for the closely wound yarn grouped in the several series of helices.

It is possible due to the separation of the series of closely spaced helices of yarn to apply a separate treating liquid to each of the yarn helices and to separately collect the liquids in trays arranged below the device, at least without a prohibitive amount of mixing of the liquids.

The yarn may be readily discharged from the end of the device, as its passage is not retarded by ears 70 on plate 54, whereupon if desired the yarn may be then conducted immediately to a collecting device or the yarn may be subjected to drying and thereafter collected.

In the continuous manufacture of viscose rayon it is desirable to dry the yarn before it is collected. When viscose rayon yarn is dried it shrinks linearly and therefore a method of continuously drying yarn in linear form upon supports must provide means on which the yarn may contract.

In Figures 12 and 13 of the drawings a device formed in accordance with the present invention is illustrated. In this modification the yarn supporting and advancing mechanism is angularly disposed to cause the convolutions of yarn in the helix to travel in a path of progressively smaller diameter thereby to compensate for the shrinkage in the yarn as it is dried. Shaft 85 has keyed thereto plate 86 secured in position by cap nut 87. Plate 86 is dished in such a manner as to provide it with an angularly disposed rim 88. Plate 86 forms a cover for a cup member 89 likewise provided with an angularly disposed marginal portion 90 which extends parallel to rim 88 of the plate. Cup member 89 and plate 86 constitute a housing 91. A tubular shaft 92 is carried by shaft 85 and a sun gear 93 is mounted on the inner end of the tubular shaft. Shaft 85 and tubular shaft 92 extend through a closely fitting opening at the center of cup member 89. A bevel gear 94 is secured to tubular shaft 92 for the purpose of driving the same from a source of power, not shown. A series of converging bars 95 extend through openings 96 in rim 88 of plate 86 and the inner ends of bars 95 are anchored within openings 97 in cup member 89. Lock screws 98 are provided for securing the ends of bars 95 within the openings in the cup member.

Planet gears 99 are mounted on bars 95, the planet gears 99 and the sun gear being beveled sufficiently to accommodate the angular disposition of the planet gears and the sun gear as a result of the angular mounting of bars 95. Planet gears 99 are each formed with a flange 100 spaced sufficiently from their respective bars 95 to provide a recess 101 for the reception of the inner end of a coil cam member 102. One of the coil cam members 102 is mounted upon each of the bars 95. Coil cam members 102 are secured within recesses 101 by suitable means whereby rotation of the planet gears will result in corresponding rotation of the coil cam members about their respective bar 95.

In operation of the device illustrated in Figures 12 and 13 the yarn is delivered to the bars adjacent plate 86 following the liquid treatment thereof and upon rotation of shaft 85 and tubular shaft 92 a helix of yarn will be formed upon the bars, the convolutions of yarn being advanced in the manner heretofore described in connection with the other forms of the invention. Upon rotation of shaft 92 at a speed one-half that of shaft 85 the turns of yarn will be maintained between adjacent coils of the coil cam members throughout the length of the helix. The yarn in its travel upon this modified form of devices will be delivered to the bars adjacent plate 86 in wet condition and the yarn will move in a helical path. The helical path is such that the turns or convolutions thereof are constantly decreasing in diameter and substantially dry yarn will be discharged from the free end of the device. As the yarn is passed over the device and dried by any suitable means, not shown, it will shrink and therefore the yarn will closely adhere to the outer surfaces of the bars 95 and will therefore be constantly displaced toward the discharge end of the device. It is to be understood that in utilizing a drying device embodying the principles here involved, similar results may be obtained by substituting conical bars and conical coil cam members for the converging bars and coil cam members.

While the central shaft has been illustrated in each of the figures as the means for propelling the cage-like member formed of the bars, coil cam members and the housing, and the sun gear has either been maintained stationary, as shown in Figures 6-9, inclusive, or driven by the tubular shaft, as shown in the remaining figures, it is to be understood that the tubular shaft may be utilized to drive the cage-like member and the central shaft may be utilized to drive the sun gear or to hold it in stationary position, as desired.

It is likewise to be understood that various means may be utilized for driving the cage-like member and effecting the relative movement of the coil cam members about their respective bars without departing from the broad aspects of the invention, and that the distance between the convolutions of yarn may be modified as desired by driving the coil cam members at an appropriate speed, depending upon the speed of rotation of the cage-like member.

Throughout the claims where the term "housing" is used, it expressly includes an enclosed structure or a composite or single plate and the like as it is obvious that any suitable means for supporting the bars and coil cam members may be employed.

What is claimed is:

1. A thread-storage, thread-advancing device comprising a drive shaft supported at one end, a plurality of relatively fixed, bodily rotatable supports parallel to and substantially equally spaced from the axis of the shaft adapted to receive thread convolutions thereon when rotated, means for rotating said thread supports with the shaft, continuous coil cam members adjacent to and extending beyond the thread engaging surfaces of the thread supports and means for independently rotating the cam members during bodily rotation of the supports for moving thread along the supports toward a point of discharge.

2. A thread-storage, thread-advancing device comprising a shaft supported at one end, a plurality of thread supporting bars parallel to and substantially equally spaced from the axis of the shaft mounted for rotatable movement there-about, means for rotating said bars bodily about the axis of the shaft, continuous coil cam members adjacent the bars and means for operating the cam members during bodily rotation of the bars for displacing thread encircling the supports toward the free ends thereof.

3. A cantilever thread-storage, thread-advancing device comprising a horizontal shaft, a vertically arranged housing keyed to the shaft for rotation therewith, a plurality of annularly arranged horizontal bars extending from the housing, a coil cam member axially positioned over each of the said bars and adapted for rotation thereon, said coil cam members extending into the housing, a plurality of gears mounted for rotation in fixed position within the housing, each of the gears being secured to one of the coil cam members, and means for effecting rotation of the gears with respect to the housing, whereby delivery of thread to the bars and rotation of the bars and housing will cause the threads to pass around the bars and upon simultaneous rotation of the coil cam members on the bars, the thread will be caused to move in a helical path.

4. A self-threading, self-cleaning, thread-storage, thread-advancing device of cantilever construction comprising a cage-like member having a plurality of annularly arranged, spaced bars anchored therein, for rotation therewith, and providing thread supporting surfaces, means mounted for independent rotation relative to the bars on at least some of the bars for displacing thread longitudinally thereof whereby convolutions of thread are passed in a multiplicity of helices from one end of the device to the other upon rotation of the member.

5. A self-threading, self-cleaning, thread-storage, thread-advancing device of cantilever construction comprising a cage-like member having a plurality of annularly arranged, spaced bars anchored in and around the periphery thereof, for rotation therewith, and providing thread supporting surfaces, means mounted for independent rotation relative to the bars on each of the bars for displacing thread longitudinally thereof whereby convolutions of thread are passed in a multiplicity of helices from one end of the device to the other upon rotation of the member.

6. A thread-storage, thread-advancing device of cantilever construction comprising a rotatably mounted cage-like member comprising a housing having a plurality of annularly arranged, spaced bars anchored around the periphery thereof, a planetary gearing consisting of a sun gear meshing with planet gears arranged around the periphery of the sun gear, a coil cam member surrounding each of the bars and attached to each of the planet gears for rotation therewith, means for rotating the cage-like member and means for causing relative rotation between the cage-like member and the sun gear whereby the coil cam members are rotated about their individual axes.

7. A thread-storage, thread-advancing device of cantilever construction comprising a rotatably mounted cage-like member comprising a housing having a plurality of annularly arranged, spaced bars anchored around the periphery thereof, a planetary gearing consisting of a sun gear meshing with planet gears arranged around the periphery of the sun gear, a coil cam member surrounding each of the bars and attached to each of the planet gears for rotation therewith, means for rotating the cage-like member and means for maintaining the sun gear stationary whereby the coil cam members are rotated about their individual axes.

8. A thread-storage, thread-advancing device of cantilever construction comprising a rotatably mounted cage-like member comprising a housing having a plurality of annularly arranged, spaced bars anchored around the periphery thereof, a planetary gearing consisting of a sun gear meshing with planet gears arranged around the periphery of the sun gear, a coil cam member surrounding each of the bars and attached to each of the planet gears for rotation therewith, means for rotating the cage-like member and means for rotating the sun gear at a rotary speed different from the cage-like member whereby the coil cam members are rotated about their individual axes.

9. A thread-storage, thread-advancing device of cantilever construction comprising a rotatably mounted cage-like member comprising a housing having a plurality of annularly arranged, spaced bars anchored around the periphery thereof, a planetary gearing mounted in the housing and consisting of a sun gear meshing with planet gears arranged around the periphery of the sun gear, a coil cam member surrounding each of the bars and attached to each of the planet gears for rotation therewith, a central drive shaft, a tubular shaft mounted thereon, said cage-like member being fixed to one of the shafts for rotation therewith and said sun gear being fixed to the other shaft whereby upon relative rotation between the central shaft and tubular shaft, the coil cam members are rotated about their individual axes.

10. A thread-storage, thread-advancing device of cantilever construction comprising a rotatably mounted cage-like member comprising a housing having a plurality of annularly arranged, spaced bars anchored around the periphery thereof, a planetary gearing mounted in the housing and consisting of a sun gear meshing with planet gears arranged around the periphery of the sun gear, a coil cam member surrounding each of the bars and attached to each of the planet gears for rotation therewith, a rotatable central shaft, a stationary tubular shaft mounted on the rotatable central shaft, said sun gear being fixed to the stationary tubular shaft and said cage-like member being fixed to the rotatable central shaft whereby upon rotation thereof, the coil cam members are rotated about their individual axes.

11. A thread-storage, thread-advancing device of cantilever construction comprising a rotatably mounted cage-like member comprising a housing having a plurality of annularly arranged, spaced bars anchored adjacent the periphery thereof, a planetary gearing mounted in the housing and consisting of a sun gear meshing with planet gears arranged around the periphery of the sun gear, a coil cam member surrounding each of the bars and attached to each of the planet gears for rotation therewith, a drive shaft, a tubular shaft mounted thereon, said cage-like member being fixed to the drive shaft, and said sun gear being fixed to the tubular shaft whereby upon relative rotation between the drive shaft and tubular shaft, the coil cam members are rotated about their individual axes.

12. A self-threading, self-cleaning, thread-storage, thread-advancing device of cantilever construction comprising a cage-like member formed of a housing having a plurality of annularly arranged, spaced bars anchored around the periphery thereof, a rotatable central shaft and a stationary tubular shaft mounted thereon, a sun gear fixed to the stationary tubular shaft, the cage-like member being fixed to the central shaft for rotation therewith, planet gears meshing with the sun gear and arranged for rotation around the periphery thereof, said planet gears having attached thereto coil cam members with the spaced bars extending therethrough, means for driving said central shaft while maintaining the tubular shaft stationary whereby the coil members are rotated about their individual axes.

13. A thread-storage, thread-advancing device of cantilever construction for imparting several treatments to a freshly spun yarn comprising a rotatably mounted cage-like member comprising a housing having a plurality of annularly arranged, spaced bars anchored around the periphery thereof, a planetary gearing mounted in the housing and consisting of a sun gear meshing with planet gears arranged around the periphery of the sun gear, a coil cam member surrounding each of the bars and attached to each of the planet gears for rotation therewith, said coil cam member consisting of several continuous series of closely spaced convolutions, each series being connected by a widely spaced convolution, a central drive shaft, a tubular shaft mounted thereon, said cage-like member being fixed to one of the shafts for rotation therewith and said sun gear being fixed to the other shaft whereby upon relative rotation between the central shaft and tubular shaft, the coil cam members are rotated about their individual axes.

14. A thread-storage, thread-advancing device of cantilever construction for drying freshly spun yarn comprising a rotatably mounted cage-like member comprising a housing having a plurality of annularly arranged, spaced bars anchored around the periphery thereof, said bars being angularly disposed so that they converge from one end of the cage-like member to the other, a planetary gearing mounted in the housing and consisting of a sun gear meshing with planet gears arranged around the periphery of the sun gear, a coil cam member surrounding each of the bars and attached to each of the planet gears for rotation therewith, a central drive shaft, a tubular shaft mounted thereon, said cage-like member being fixed to one of the shafts for rotation therewith and said sun gear being fixed to the other shaft whereby upon relative rotation between the central shaft and tubular shaft, the coil cam members are rotated about their individual axes.

15. A self-threading, self-cleaning, thread-storage, thread-advancing device of cantilever construction comprising a rotatable cage-like member having a plurality of annularly arranged spaced bars for bodily rotation with the cage-like member and providing thread-supporting surfaces, means mounted for independent rotation relative to the bars on at least some of the bars for displacing thread longitudinally thereof, whereby convolutions of thread are passed in a multiplicity of helices from one end of the device to the other upon rotation of the member.

WILLIAM V. HENRY.

REFERENCES CITED

The following references are of record in the file of this patent:

UNITED STATES PATENTS

| Number | Name | Date |
| --- | --- | --- |
| 2,369,481 | Modigliani | Feb. 13, 1945 |
| 2,386,249 | McDermott | Oct. 9, 1945 |

FOREIGN PATENTS

| Number | Country | Date |
| --- | --- | --- |
| 233,370 | Germany | Oct. 15, 1908 |
| 539,200 | Great Britain | Feb. 29, 1940 |